United States Patent [19]
He et al.

[11] Patent Number: 6,111,619
[45] Date of Patent: Aug. 29, 2000

[54] METHOD OF FORMING POLYCRYSTALLINE SILICON TFTS WITH TIN/CU/TIN INTERCONNECTIONS FOR A LIQUID CRYSTAL DISPLAY PIXEL ARRAY

[75] Inventors: Shusheng He; Tue Nguyen, both of Vancouver, Wash.

[73] Assignee: Sharp Laboratories of America, Inc., Camas, Wash.

[21] Appl. No.: 09/321,525

[22] Filed: May 27, 1999

[51] Int. Cl.[7] .................................................. G02F 1/136
[52] U.S. Cl. ................................. 349/43; 349/46
[58] Field of Search .............................. 349/43, 42, 187, 349/46, 139

[56] References Cited

U.S. PATENT DOCUMENTS

| | | | |
|---|---|---|---|
| 5,162,933 | 11/1992 | Kakuda et al. | 349/46 |
| 5,608,557 | 3/1997 | Wu | 349/42 |
| 5,760,854 | 6/1998 | Ono et al. | 349/38 |
| 5,815,223 | 9/1998 | Watanabe et al. | 349/42 |
| 5,818,550 | 10/1998 | Kadota et al. | 349/43 |
| 5,897,182 | 4/1999 | Miyawaki | 349/43 |
| 5,939,788 | 8/1999 | McTeer | 257/751 |

OTHER PUBLICATIONS

Article entitled, "Development of Aluminum Gate Thin–Film Transistors based on Aluminum Oxide Insulators", by T. Tsukada, MRS Proceeding, Fall 92, Abs. G7.1; Kawachi et al., IEEE Trans. Electron Dev., 41 (1994) 1120.

Article entitled, "P–5: 11–8–and 10.4–in.—Diagonal Color TFT–LCDs with XGA Compatibility", by Sakurai et al., SID 93 Digest, p. 463: Shimada et al., SID 93 Digest, p. 467.

Article entitled, "22.1: A Six–Mask TFT–LCD Process Using Copper–Gate Metallurgy", by P.M. Fryer et al., SID 96 Digest, pp. 333–336.

Article entitled, "Direct Writing and Lift–Off Patterning of Copper Lines at 200° C. Maximum Process Temperature", by C.M. Hong, et al., MRS Proceeding, vol. 471, pp. 35–41, 1997.

Article entitled, "Manufacturability of Chemical Vapor Deposition of Copper" by T. Nguyen, et al., Semicon/Kansai 96 ULSI Technology Seminar, pp. 2829–2833.

Article entitled, "Dry Etching Technique for Subquarter–Micron Copper Interconnects", Y. Igarashi, T. Yamanobe, T. Ito, J. Electrochem. Soc., 142, L36–L37, 1995.

*Primary Examiner*—Walter Malinowski
*Attorney, Agent, or Firm*—David C. Ripma; Matthew D. Rabdau

[57] ABSTRACT

The invention provides a TFT LCD structure and method for using copper conductors on polycrystalline silicon TFTs. A top gate TFT architecture is employed with the copper sandwiched between layers of TiN. Conventional photolithographic and wet etch patterning is used for the copper and TiN conductors. Copper metal gates and source/drain electrodes are provided, yielding TFTs of a quality comparable to TFTs employing aluminum electrodes and conductors. A method of fabrication is also disclosed.

26 Claims, 4 Drawing Sheets

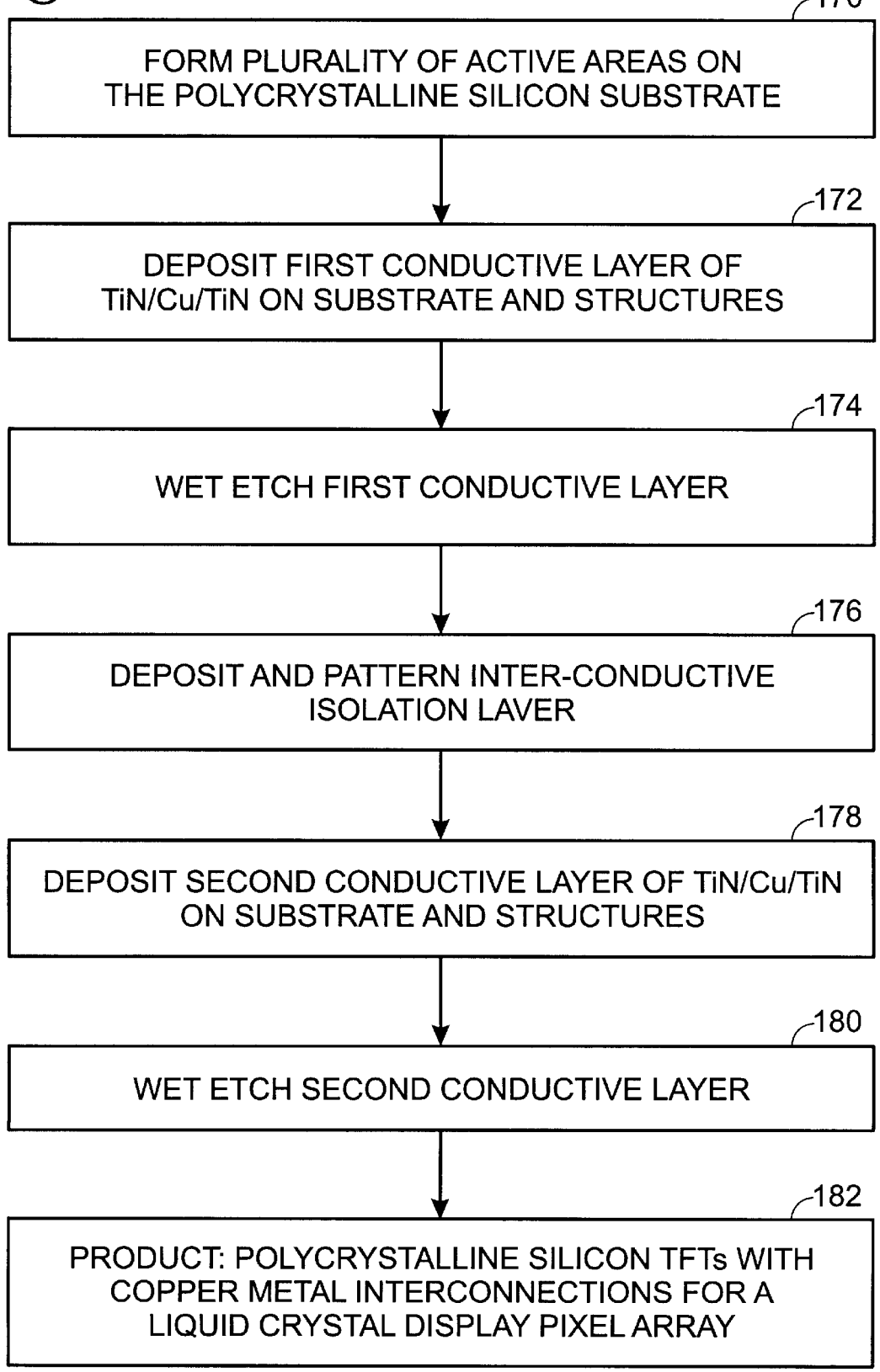

METHOD OF FORMING POLYCRYSTALLINE SILICON TFTS WITH TIN/CU/TIN INTERCONNECTIONS FOR A LIQUID CRYSTAL DISPLAY PIXEL ARRAY

BACKGROUND AND SUMMARY OF THE INVENTION

The invention relates generally to liquid crystal displays (LCDs) and, more particularly, to the formation of copper electrodes and conductive lines on polycrystalline silicon thin-film transistor (TFT) LCDs.

Liquid crystal displays (LCDs) have a large number of pixel elements or pixels arranged in a rectangular array. Each pixel is controlled by an active device, preferably a thin film transistor (TFT). Driver circuitry which controls the display is connected to individual pixel TFTs by a grid of metal lines arranged in rows and columns. In active matrix LCDs each pixel is individually addressable. One set of parallel lines ("gate lines") is operatively connected to the gates of the TFTs in the pixel array. The intersecting lines are connected to the source or drain of each TFT (referred to herein, for convenience, as the "source lines"). The other source/drain electrode of each TFT, the one not connected to the source line, is coupled to a pixel electrode, which is energized when the TFT is turned on.

A limitation on the development and manufacture of large area LCD panels is high resistivity in the metal gate and source lines used to address individual pixels of the display. Aluminum and aluminum alloys have are often used for gate and source lines because of relatively low resistivity (3–4 $\mu\Omega$-cm). But Aluminum presents processing problems associated with hillock formation. Other metals such as tantalum or chromium present different problems such as higher resistivity.

Gate and source line resistance becomes an increasing problem as LCDs grow in size. Line resistance produces attenuation and distortion of signal pulses, causing non-uniform images and variations in brightness. Changing to wider or thicker lines is not an option in many LCD applications. Wider gate and source lines reduces the pixel apertures on an LCD. Increasing the thickness of the metal lines presents processing difficulties. Because LCD panels have interconnect lines which are much longer than those in integrated circuit (IC) chips, the problems of line resistivity are more severe in LCDs than in ICs.

Copper metal interconnects are now used in ICs and the problems and benefits associated with copper processing are now known. The advantage of copper over aluminum and other metals used in semiconductor processing is that copper has low resistivity (1.78 $\mu\Omega$-cm). But it is very difficult to use. Copper adheres poorly to oxides and glass. Pollutants from copper severely degrade the silicon in thin film transistor (TFT) channel regions, reducing minority carrier lifetimes and severely degrading device performance. The heating steps necessary in IC and many LCD manufacturing processes increases the rate and severity of copper diffusion into adjacent silicon regions. A solution to both the adhesion and diffusion problems is to cap or enclose the copper in a barrier material.

Copper conductors have been used in amorphous silicon TFT LCDs. Amorphous silicon TFTs use a bottom gate architecture with silicon nitride (SiN) as a gate insulator. Such amorphous silicon TFTs have proved feasible in part because silicon nitride acts as an effective diffusion barrier, even during the heating steps required for processing the TFTs. Such a bottom-gate architecture is incompatible with polycrystalline silicon TFTs because the metal conductors are deposited first and the temperatures required to crystallize the silicon melts the metal. Polycrystalline silicon (also known as "polysilicon" or "poly-Si") TFTs have advantages in performance over amorphous silicon TFTs due to polycrystalline silicon's higher carrier mobility's. But to use polycrystalline silicon, it is necessary to use a top-gate TFT architecture, which allows the silicon applied to the glass substrate to be crystallized prior to application of the metal electrodes and the gate and source lines.

In top-gate TFTs formed in polycrystalline silicon, the preferred gate insulator is silicon dioxide, which avoids the excessive defect densities associated with silicon nitride. Silicon dioxide, however, is not as effective a diffusion barrier for copper as is silicon nitride. That is one reason copper gates have not heretofore been used in polycrystalline silicon TFTs. Another reason is the poor adhesion between copper and silicon dioxide.

It would be advantageous to have a process for forming TFTs in polycrystalline silicon on LCDs which uses copper gate and source lines, taking advantage of copper's low resistivity compared with aluminum and most other metals.

It would also be advantageous have a method of forming copper metal gate and source/drain electrodes on LCD TFTs formed in polycrystalline silicon which uses wet etch processes for defining the metal regions on the pixel array, including the gate and source lines.

Accordingly, a liquid crystal display (LCD) structure having a plurality of thin film transistors (TFTs) and operative interconnections formed on a substrate is provided in the present invention. The structure comprises a plurality of active areas of polycrystalline silicon formed on the LCD substrate, which is preferably glass or the like. Each active area includes source, drain, and channel regions of a TFT. A gate electrode on each active area is formed adjacent the channel region. Source and drain electrodes are formed on the respective source and drain regions of each active area. A plurality of conductive lines are formed on the substrate to provide operative interconnections to selected TFTs on the substrate. The conductive lines include a plurality of first conductive lines operatively connected to the gate electrodes and a plurality of second conductive lines operatively connected to a second electrode of each selected TFT. The second electrode is either the source or drain electrode. The other of the source or drain electrodes, not operatively connected to the second conductive lines, is preferably connected to a transparent pixel electrode. The first and second conductive lines on the substrate, and the respective gate and second electrodes to which the lines are operatively connected on each TFT, are multi-layer structures having first/second/third layers as follows: TiN/Cu/TiN.

The preferred cross-sectional dimensions of the structure of the conductive lines and electrodes used in the LCD structure of the present invention is as follows. The first TiN layer has a thickness generally in the range of 100 Å to 1,500 Å. The second copper layer has a thickness generally in the range of 1000 Å to 10,000 Å. And the third TiN layer has a thickness generally in the range of 100 Å to 1,500 Å.

The LCD structure is formed in accordance with the method of the present invention. The method is used to form a LCD structure on a LCD substrate having a layer of polycrystalline silicon formed on a surface thereof The method comprises the following steps. A plurality of thin film transistor structures is provided by patterning the polycrystalline silicon on the substrate. The patterning forms a plurality of active areas on the substrate. Each active area is formed by forming source drain and channel regions and depositing a gate dielectric on each channel region. A first conductive layer or conductor is then deposited on the substrate and the structures which have already been formed on the substrate. The first conductor has first/second/third layers as follows: TiN/Cu/TiN. The first conductor is then patterned to form a plurality of first conductive lines on the substrate and to form a first electrode on each TFT structure. The lines and electrodes have TiN/Cu/TiN first/second/third layers. A dielectric layer is then deposited over the structures formed thus far and patterned to provide inter-conductor isolation. Then a second conductor is deposited on the substrate and structures. The second conductor has first/second/third layers as follows: TiN/Cu/TiN. Finally, the second conductor is patterned to form a plurality of second conductive lines on the substrate and to form a second electrode on each TFT structure. The second lines and electrodes have TiN/Cu/TiN first/second/third layers.

In the preferred embodiment of the invention the step of depositing the first conductor on the substrate and structures includes the following steps. The first layer of TiN is deposited by physical vapor deposition (PVD), alternatively known as sputtering. Then a second layer of copper is deposited on the first layer of TiN by chemical vapor deposition (CVD). Then a third layer of TiN is deposited on the second layer of copper by PVD.

The thickness of each of the various layers deposited during the steps of depositing the first and second conductors is preferably within the following ranges. The first layer of TiN is deposited to a thickness generally in the range of 100 Å to 1,500 Å. The second layer of copper is deposited to a thickness generally in the range of 1000 Å to 10,000 Å on the first layer of TiN. And the third layer of TiN is deposited to a thickness generally in the range of 100 Å to 1,500 Å on the second layer of copper.

The steps of patterning the first conductor (TiN/Cu/TiN) and the second conductor (TiN/Cu/TiN) is preferably carried out by a wet etch process wherein photoresist is first deposited and patterned on the top surface of the conductor. Then the first TiN layer is removed by etching with a TiN etchant. Then the second Cu layer is removed by etching with a copper etchant. Then the third layer (TiN) is removed by etching with a TiN etchant. Finally, the photoresist is removed from the surface of the unetched areas.

The method also provides for the deposition of a third electrode deposited generally simultaneously with the electrode connected to the source or drain of the TFT, to provide an operative connection to a pixel electrode.

BRIEF DESCRIPTION OF THE DRAWINGS

FIG. 8 shows the steps in a first embodiment of the method of the present invention.

DETAILED DESCRIPTION OF THE PREFERRED EMBODIMENT

Figure 1:
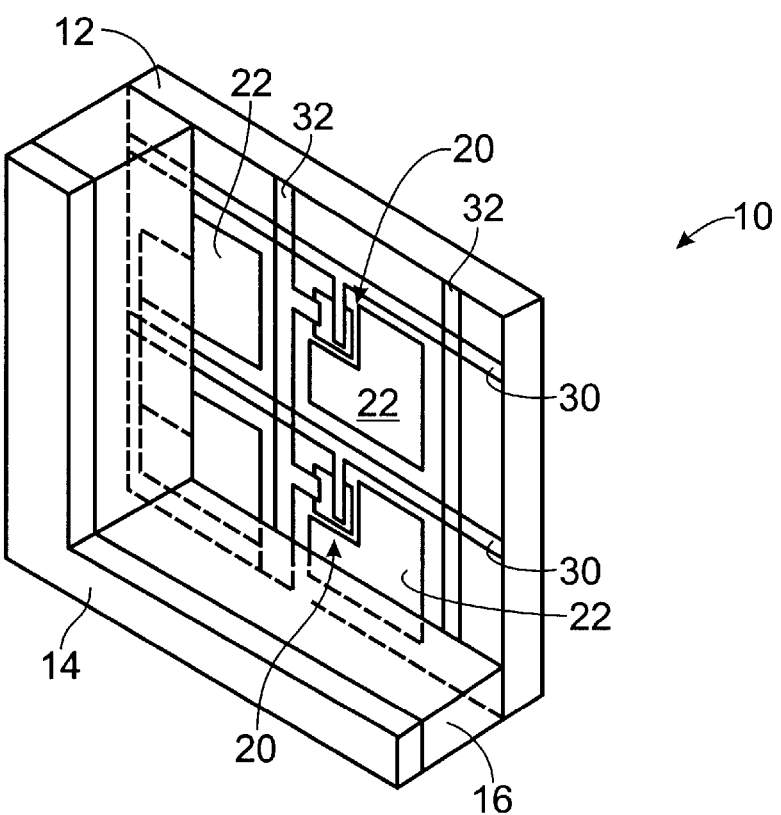
FIG. 1 is a partial perspective view, partially cut away, showing a segment of a LCD panel in accordance with the present invention.

FIG. 1 shows a portion of a LCD panel partially cut away to reveal the structure of individual pixels. Display 10 includes a LCD substrate 12 typically formed of glass or another suitable transparent material. A parallel substrate 14 encloses liquid crystal material 16 between the substrates. The surface of pixel array substrate 12 is coated with a layer of polycrystalline silicon in which a plurality of thin film transistors (TFTs) 20 are formed. The TFTs act as switching elements for pixel electrodes 22, formed of a transparent conductive material such as indium tin oxide (ITO). Parallel rows and intersecting columns of conductors 30, 32, respectively, provide operative electrical interconnections between TFTs 20 and suitable driver circuitry (not shown).

Typically, a LCD panel includes a fist polarizing filter (not shown) which is applied to the pixel array substrate 12. A second polarizing filter (not shown), oriented in a different direction, is applied to second substrate 14. Liquid crystal material 16 contains molecules which rotate the incident light in a well-defined manner when a pixel electrode 22 is turned on. Thus, light passing through panel 12 and pixel electrode 22, when turned on, is rotated by the liquid crystal material 16 and passes through substrate 14. When the pixel is turned off, the polarized light is not rotated and, thus, will not pass through the second polarizer. The array of pixels on panel 12, when turned on or off in a predetermined pattern, produces images.

Figure 2:
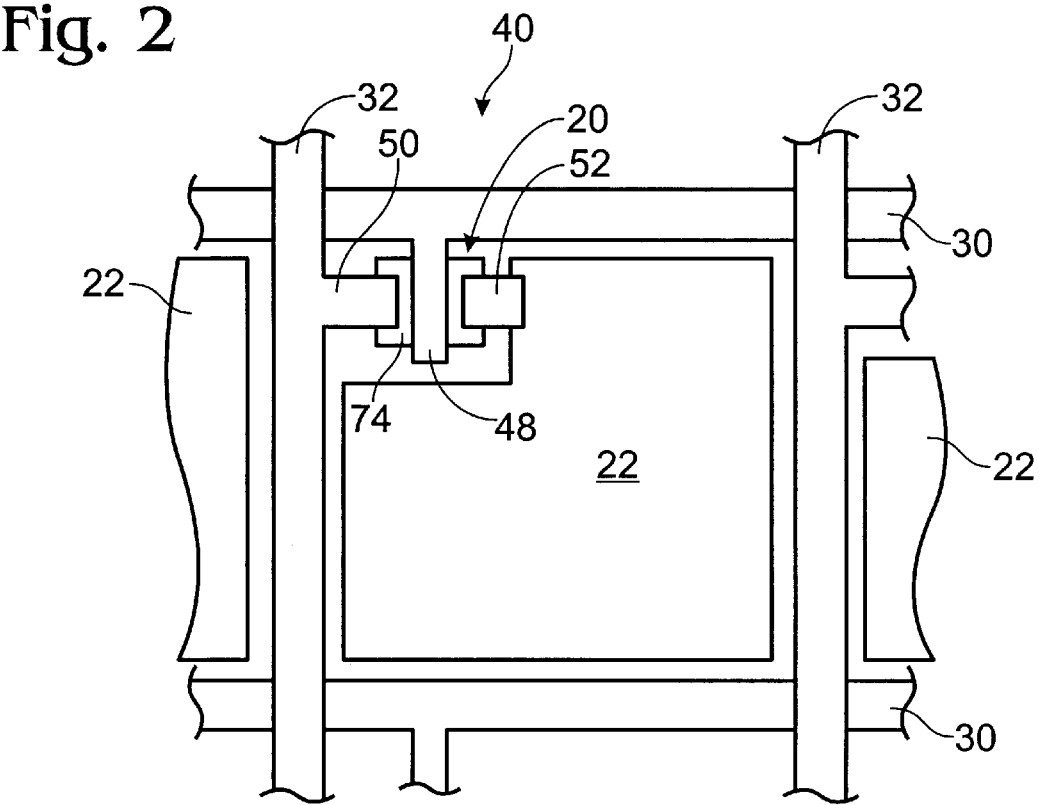
FIG. 2 is a partial plan view of a small segment of a LCD pixel array formed in accordance with the present invention.

FIG. 2 is a plan view of a single pixel 40 (TFT 20 and pixel electrode 22) on pixel array substrate 12. Conductive lines 30, 32 provide operative interconnections to selected TFTs on substrate 12. A plurality of parallel gate lines 30 are integral with the gate electrodes 48 of all the TFTs extending along a single gate line. A plurality of parallel source lines 32 are integral with the source electrodes 50 of all the TFTs extending along a single source line.

Line conductors 30, 32 are electrically isolated from one another at their respected intersection points, where they cross over or under one another. Conductive lines 30, 32 are operatively connected to suitable TFT LCD driver circuitry which, in the case of polycrystalline silicon TFTs, can be integrated onto substrate 12 (not shown). Alternatively, the driver circuitry can be external to the substrate and interconnected by flexible connectors. Lines 30, 32 are alternatively referred to as the gate and source lines, respectively. It will be understood by those skilled in the art that source lines 32 are integral with either a source or drain electrode, depending on the nomenclature adopted, and might alternatively referred to herein as a drain lines. For convenience, the term source line will be used when referring to a conductive line connected to either the source or drain of a TFT 20. As will be explained in detail in the method of the present invention, described below, gate lines 30 and source lines 32, as well as source drain/electrodes 50, 52, respectively, all have a three-layer structure in accordance with the present invention. The structure of the conductive lines and electrodes, viewed in cross section, have first/second/third layers as follows: TiN/Cu/TiN.

Figure 3:
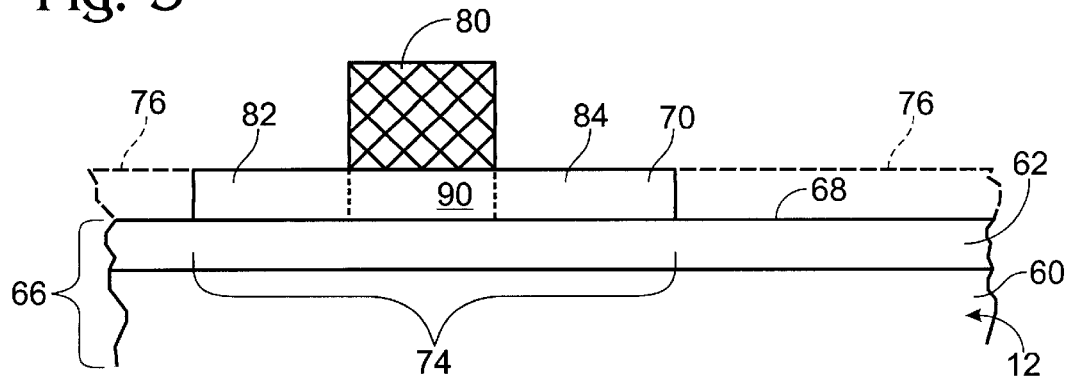
FIGS. 3–6 are partial cross-sectional views, taken along line 3—3 of FIG. 2, greatly enlarged, showing steps in the method of the present invention.

The steps in a preferred embodiment of the method of the present invention will be described with reference to FIGS. 3–7. Referring to FIG. 3, LCD pixel array substrate 12 includes a glass panel 60 preferably coated with an insulating layer of silicon dioxide 62, the silicon dioxide having a suggested thickness of 10,000 Å. Glass 60 and silicon dioxide layer 62 together form a LCD substrate which will hereinafter be referred to as substrate 66 (layer 62 will be omitted from the other drawings). The top surface 68 of LCD substrate 66 has a layer of polycrystalline silicon 70 formed thereon. FIG. 3 shows the substrate in cross section after carrying out several well known preliminary steps in the formation of active areas in a polycrystalline silicon layer on substrate 66.

Polycrystalline silicon layer 70 is first deposited by PECVD on the surface 68 of substrate 66 as an amorphous silicon (a-Si:H) layer. It is dehydrogenated at 400° C. for two hours in $N_2$. The deposited thickness of silicon layer 70 is generally in the range of 300 Å–1,000 Å with a suggested thickness of 500 Å. Layer 70 is thermally annealed at 600° C. for 40 hours in $N_2$ for solid phase crystallization, yielding a layer of polycrystalline silicon. The regions outside active area 74 are etched by reactive ion etching (RIE) using $Cl_2$ and $O_2$ chemistry to define the active area. The portions of polycrystalline silicon layer 70 outside the active area 74 have been removed down to the surface 68 of the substrate. The removed portions are shown with dashed lines 76 in FIG. 3. A photoresist pattern 80 is formed centrally on active area 74 and appropriate doping impurities are implanted into the unmasked areas 82, 84 to create n-type or p-type semiconductor material. Doping activation of the implanted source/drain regions 82, 84 is carried out by annealing at 600° C. for 40 hours in $N_2$. Following activation, regions 82, 84 will become the source and drain regions of a thin film transistor (TFT) formed on substrate 66.

Figure 4:
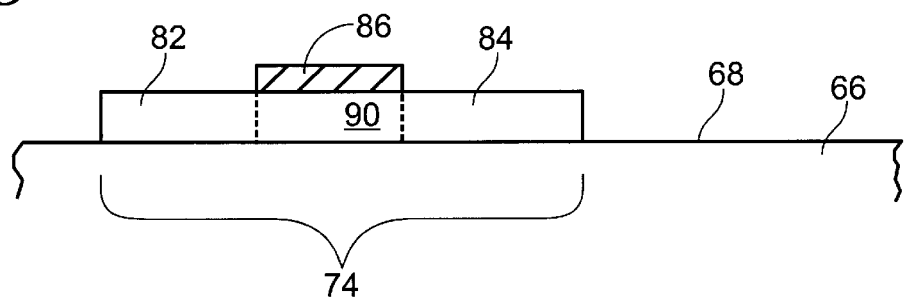

After removal of resist pattern 80, a layer of silicon dioxide (not shown) is deposited on the surface of the substrate and the patterned active areas. Following appropriate patterning, a gate dielectric layer 86 is formed centrally on active area 74, as shown in FIG. 4. The result is a TFT structure 94 which includes source region 82, drain region 84 and a channel region 90, with gate dielectric 86 deposited thereon. At this time in the processing of a LCD pixel array, the pixel electrode regions would also be formed (not shown). Such steps are conventional and include the formation of ITO regions on substrate 66, as will be well known to those skilled in the art.

Figure 5:
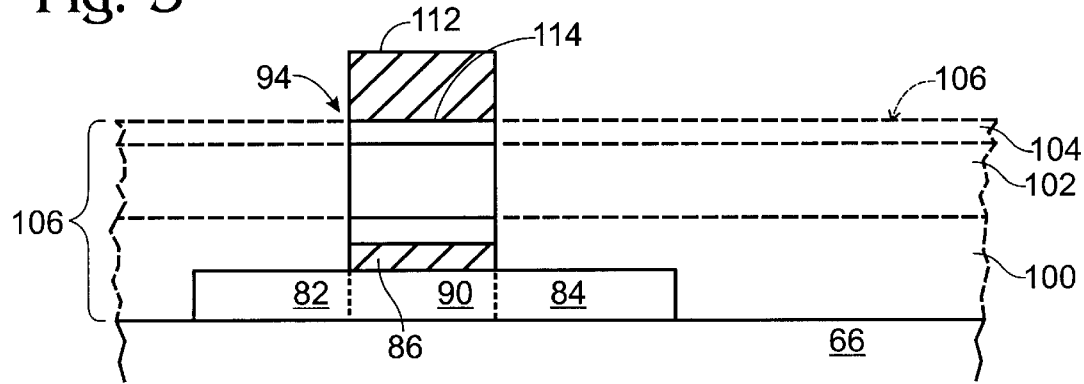

FIG. 5 shows the steps of depositing and patterning a first conductor of TiN/Cu/TiN on the substrate 66 and TFT structure 94. A first layer of TiN (titanium nitride) 100 is deposited over the TFT substrate and the structures formed thereon by sputtering, alternatively known as physical vapor deposition (PVD). First layer 100 is preferably deposited to a thickness generally in the range of 100 Å to 1,500 Å. Then a second layer of copper metal is deposited on first layer 100 by chemical vapor deposition (CVD). Any suitable CVD copper deposition methodology can be used such as, for example, using the CVD copper precursors described in U.S. Pat. No. 5,767,301. The copper layer 102 is preferably deposited to a thickness generally in the range of 1,000 Å to 10,000 Å on TiN layer 100. Then a third layer 104 of TiN is deposited, again by PVD. The preferred thickness of layer 104 is generally in the range of 100 Å to 1,500 Å. Following the deposition of layers 100, 102, 104 (collectively referred to as the "first conductor" 106) on substrate 66, and all the TFT structures 94 formed thereon, the portions outside the gate area (shown with the solid lines in FIG. 5) are removed.

The removal is accomplished by patterning the first conductor 106 by depositing a layer of photoresist 112 and, by conventional photolithographic techniques, forming a resist pattern on the surface of the first conductor. The resist pattern covers the gate areas 114 of each TFT structure 94, overlying gate dielectric 86. The pattern also covers the gate lines 30 (See FIG. 2) and any other areas where the first conductor 106 is not being removed. Following the formation of resist pattern 112, the first conductor is patterned by removing the areas outside the resist pattern 112, shown generally with dashed lines in FIG. 5.

The preferred method of removing the portions of the three-layer first conductor 106 is by wet etching each individual layer. Third layer 104 is first removed by wet etching in a solution of ammonium hydroxide ($NH_4OH$), hydrogen peroxide ($H_2O_2$), and water. Following removal of the top TiN layer 104, the next step is to wet etch copper layer 102. The copper is preferably etched by nitric acid in water. Finally, bottom layer 100 of TiN is removed by wet etching using the same etchant as was used on top TiN layer 104. Alternatively, the bottom layer 100 of TiN can be removed by a conventional dry etching process using $Cl_2$ and $O_2$.

The result of the depositing and patterning steps shown in FIG. 5 is the formation of a plurality of gate lines 30 (FIG. 2) on substrate 66, as well as the formation of a first electrode (the gate electrode) on each TFT structure 94. All the lines and electrodes have metal lines of TiN/Cu/TiN first/second/third layers. Alternatively, of course, instead of forming the gate lines and electrodes first, the first conductor can be used to form source lines and source electrodes on the TFT structures, with the gate lines being formed in subsequent steps. In the example of the method illustrated in FIGS. 3–6, it is the gate lines and gate electrodes which are formed first.

Figure 6:
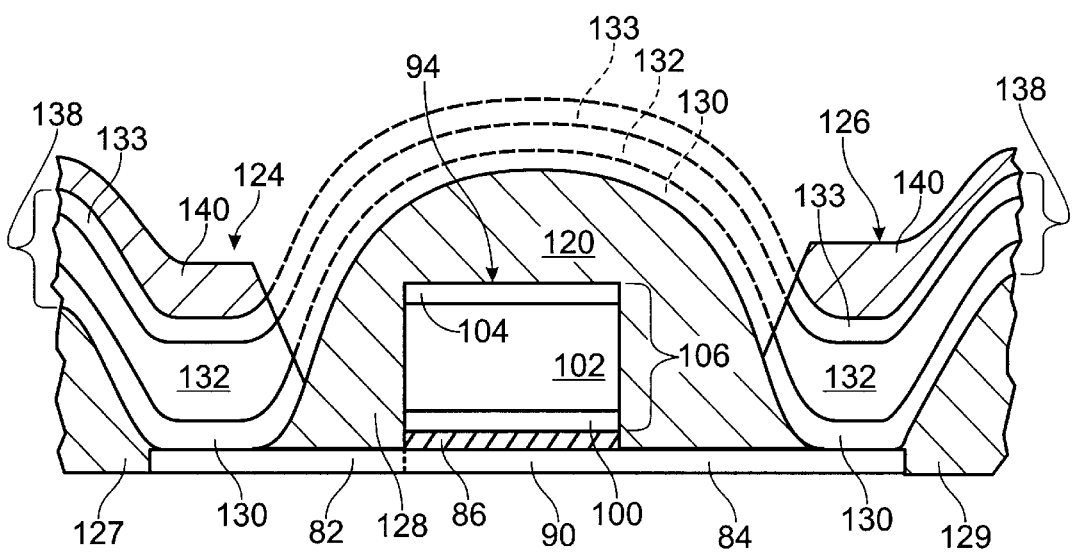

The next several steps in the method of the present invention are illustrated in FIG. 6. A layer of dielectric material, such as silicon dioxide 120, is deposited over the substrate, including all structures formed thereon. The thickness of dielectric layer 120 is preferably generally in the range of 500 Å to 1,500 Å, with a suggested thickness of approximately 1000 Å. The dielectric layer 120 is then patterned to form openings 124, 126 where a second conductive layer will contact portions of each TFT or other structures on the substrate. Openings (not shown) are also formed where pixel apertures occur in the pixel array and where the second conductive layer is applied to the substrate. The purpose of dielectric layer 120 is to provide inter-conductor isolation, for example, in places where the gate line 30 and the source line 32 cross one another and electrical isolation is necessary. FIG. 6 shows three regions of dielectric layer 120 which remain after patterning, at 127, 128, and 129. A central region 128 covers the gate electrode 114. Openings are formed at 124 and 126 to allow the subsequently deposited conductor to contact source and drain regions 82, 84, respectively on the TFT.

Following the patterning of dielectric layer 120, the next step is to deposit a second conductor having first/second/third layers as follows: TiN/Cu/TiN. The three-layer second conductor is deposited by the same steps as is first conductive layer 106. A first layer 130 is deposited by PVD to a thickness generally in the range of 100 Å to 1,500 Å. Then a second layer of copper is deposited by CVD to a thickness generally in the range of 1000 Å to 10,000 Å on layer 130. Then a third layer 133 of TiN is deposited by PVD to a thickness generally in the range of 100 Å to 1,500 Å on copper layer 132. The second conductor is deposited over the entire surface of substrate 66 and the structures previously formed thereon.

Following the deposition of the second conductor (layers 130, 132, 133 are collectively referred as second conductor 138) the next step is to pattern and etch the second conductor 138 to form additional conductive lines and electrodes on the substrate and the TFT structures. Patterning is shown in FIG. 6 by the application of photoresist pattern in areas 140. The resist 140 is on those areas of the second conductor 138 which are to remain following the etching of the conductor. In FIG. 6, the areas under resist pattern layers 140 are the source and drain electrodes of TFT 94 and interconnections to source lines 32 (FIG. 2), on the left side of FIG. 6, and to the ITO pixel electrode on the right side, as will be described.

Figure 7:
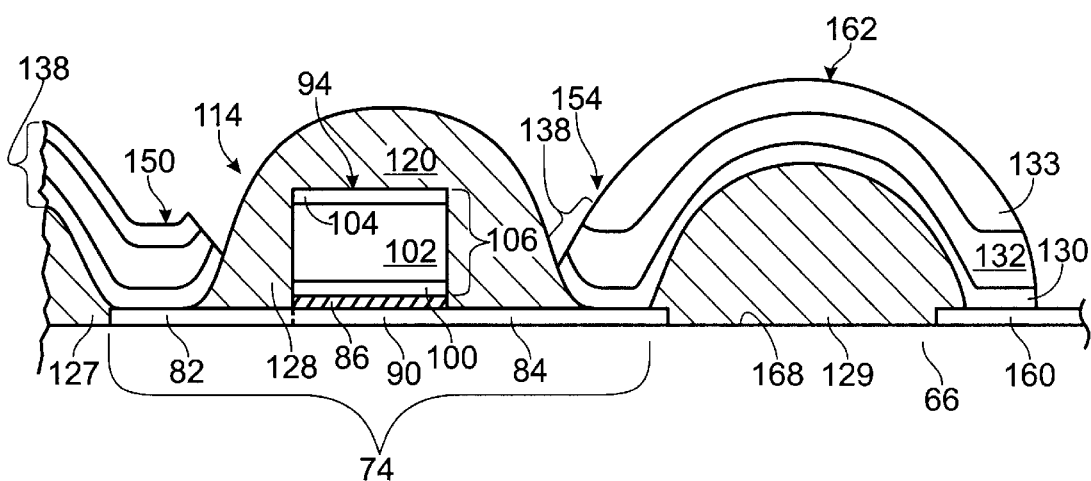
FIG. 7 is a partial cross-sectional view as in FIGS. 3–7 showing portion of a partially-completed TFT and pixel structure in accordance with the present invention.

FIG. 7 shows a part of a completed TFT structure, on a slightly larger scale, in accordance with the present invention. A TFT 94 is formed on substrate 66. The gate electrode 114 having a first TiN layer 100, second copper layer 102 and third TiN layer 104 is formed on gate dielectric 84 over channel region 90. The gate electrode is integral with a gate conductive line 30 (FIG. 2) formed on the substrate to provide operative interconnections to selected TFTs on the substrate. All the gate electrodes along a single gate line 30 will be thus interconnected. Source electrode 150 is on the source region 82 of TFT 94 and is operatively connected to a second conductive line 32 (FIG. 2). Drain electrode 154 is on drain region 84 of TFT 94 and includes an operative connection to ITO pixel electrode 160 on substrate 66. Both the source and drain electrodes 150, 154 are formed simultaneously by the deposition and patterning of second conductor 138 (FIG. 6). The source and drain electrodes, conductive lines 32 and the interconnect line 162 between drain electrode 154 and ITO pixel electrode 160 all have first/second/third layers as follows: TiN/Cu/TiN.

The invention provides a means for integrating CVD copper metal into both gate, source, and drain electrodes and gate and source interconnect lines. The process uses conventional TFT methodologies, together with low temperature copper deposition processes, such as metal organic CVD (MOCVD) copper deposition. The TiN layer serves as a diffusion barrier and provides good adhesion both to the copper and adjacent layers. Wet etching processes are used since higher resolution CMP (chemical mechanical polishing) cannot be used on LCDs due to the damage to the transparency of the plates. Because of the relatively large size of the TFTs used in LCDs, resolution tolerances achievable by photolithography (approximately 2–3 microns) is adequate for LCD applications. The TFTs and pixel arrays formed in accordance with the method of the present invention yield gate and source lines, and source, drain, and gate electrodes which are three-layer structures. They have a first layer of TiN with a thickness generally in the range of 100 Å to 1,500 Å. They have a second copper layer which has a thickness generally in the range of 1,000 Å to 10,000 Å. And they have a third TiN layer having a thickness generally in the range of 100 Å to 1,500 Å. The method is suitable for the formation of large-scale LCDs, having a grid of gate and source copper lines which, due to the high conductivity of copper, can be narrow, for example, two microns wide.

Referring to FIG. 8, the basic steps in a preferred embodiment of the present invention are shown. The steps in the preferred embodiment include step 170, forming active areas of patterned polycrystalline silicon on a LCD substrate. The active areas include source, drain, and channel regions and a gate dielectric deposited on the channel region of each active area.

Step 172 is depositing on the surface of the substrate, including previously formed structures, a first conductive layer (106 in FIG. 5) having first/second/third layers of TiN/Cu/TiN. The desired pattern of conductors is then defined by etching step 174, wherein the first conductive layer 106 is patterned and then etched, preferably by wet etch processing.

An inter-conductor isolation layer is then deposited in Step 176 to isolate the previously-deposited first conductive layer 106 from the subsequently deposited conductive layer 138 (FIG. 6). The inter-conductor deposition Step 176 also includes patterning and removal of selected areas of the deposited inter-conductor layer.

The next step 178 is the depositing of a second conductive layer (conductor 138 in FIG. 6) having first/second/third layers as follows: TiN/Cu/TiN. The processing steps are completed by Step 180 wherein the second conductive layer 138 is patterned and etched, also by a wet etch process. The product 182 is an array of polycrystalline silicon TFTs with copper metal interconnections for a liquid crystal display.

In the embodiment of the method of the present invention described herein the gate electrode and gate lines are formed first, prior to the formation of the source and drain electrodes and the source lines. It will be readily appreciated by those skilled in the art that the sequence of formation of the source and gate lines and the source/drain and gate electrodes is a matter of design choice and manufacturing optimization and could readily be reversed. For example, the step of depositing and patterning first conductor 106 could include forming either the gate, source, or drain electrode. Then the step of patterning second conductor 138 would form a second electrode which would be the gate electrode, if the first electrode formed was the source or drain electrode. Or the second electrode formed could be one of the source or drain electrodes, if the first electrode formed was the gate electrode. Similarly, if the first electrode formed is either the source or drain electrode, then the step of forming a third electrode (during the patterning of the first conductor) would be as follows: The third electrode would be the source electrode if the first electrode formed was the drain electrode, and the third electrode would be the drain electrode if the first electrode formed is the source electrode. Alternatively, if the first electrode formed is the gate electrode, the step of forming a third electrode during the patterning of the second conductor, would be the formation of the source electrode, if the second electrode formed is the drain electrode, or the drain electrode, if the second electrode formed is the source electrode. Regardless of the order in which the electrodes and conductors are formed, the electrodes and conductors formed in accordance with the method of the present invention have first/second/third layers of TiN/Cu/TiN. They thus provide the benefit of copper lines on LCDs having TFTs formed in polycrystalline silicon.

What is claimed is:

1. In a liquid crystal display (LCD) structure, a plurality thin film transistors (TFTs) and operative interconnections formed on a substrate, comprising:

a plurality of active areas of polycrystalline silicon formed on the substrate, each active area including source, drain, and channel regions of a TFT;

a gate electrode on said channel region of each said active area, and source and drain electrodes on the respective source and drain regions of each active area; and a plurality of conductive lines formed on the substrate to provide operative interconnections to selected TFTs on the substrate, each of said conductive lines being at least 2 microns wide, said conductive lines including a plurality of first conductive lines operatively connected to the gate electrodes and a plurality of second conductive lines operatively connected to a second electrode of each selected TFT, the second electrode being the source or drain electrode; and said first and second conductive lines on the substrate, and the respective gate and second electrodes to which the lines are operatively connected on each TFT, having first/second/third layers as follows: TiN/Cu/TiN.

2. The LCD structure of claim 1 wherein, in each TFT, said gate electrode, said source electrode, and said drain electrode all have first/second/third layers as follows: TiN/Cu/TiN.

3. The LCD structure of claim 1 wherein the layers of said first and second conductive lines, and the respective gate and second electrodes to which they are operatively connected, have thickness' as follows: first TiN layer generally in the range of 100 Å to 1500 Å thick; second copper layer generally in the range of 1000 Å to 10,000 Å thick; and third TiN layer generally in the range of 100 Å to 1500 Å thick.

4. A liquid crystal display (LCD) pixel array structure comprising:
   a plurality thin film transistors (TFTs) formed on a substrate, each TFT including:
   an active area of polycrystalline silicon on the substrate, the active area including source, drain, and channel regions of the TFT;
   gate, source, and drain electrodes on said active area, said electrodes each having first/second/third layers as follows: TiN/Cu/TiN; and
   a plurality of conductive lines formed on the substrate to provide operative interconnections to the electrodes of selected TFTs on the substrate, each of said conductive lines being at least 2 microns wide, said conductive lines each having first/second/third layers as follows: TiN/Cu/TiN.

5. An LCD pixel array structure as in claim 4 wherein the layers of said gate, source, and drain electrodes and said conductive lines have thickness' as follows: first TiN layer generally in the range of 100 Å to 1500 Å second copper layer generally in the range of 1000 Å to 10,000 Å thick; and third TiN layer generally in the range of 100 Å to 1500 Å thick.

6. A liquid crystal display (LCD) pixel array structure comprising:
   a plurality thin film transistors (TFTs) formed on a substrate, each TFT including:
   an active area of polycrystalline silicon on the substrate, the active area including source, drain, and channel regions of the TFT;
   a gate electrode on said channel region of said active area, and source and drain electrodes on the respective source and drain regions, said gate, source, and drain electrodes each having first/second/third layers as follows: TiN/Cu/TiN; and
   a grid of first and second conductive lines generally forming rows and columns on the substrate, each of said conductive lines being at least 2 microns wide, said conductive lines being operatively connected to said TFTs, whereby individual TFT are addressable, said conductive lines each having first/second/third layers as follows: TiN/Cu/TiN.

7. An LCD pixel array structure as in claim 1 wherein the layers of said gate, source, and drain electrodes, and of said conductive lines, have thickness' as follows: said first TiN layer being generally in the range of 100 Å to 1500 Å thick; said second copper layer being generally in the range of 1500 Å to 10,000 Å thick; and said third TiN layer being generally in the range of 100 Å to 1500 Å thick.

8. A method of forming a liquid crystal display (LCD) structure on an LCD substrate having a layer of polycrystalline silicon formed thereon, the method comprising:
   providing a plurality of thin film transistor (TFT) structures by patterning the polycrystalline silicon to form a plurality of active areas on the substrate, by forming source, drain, and channel regions in each active area, and by depositing a gate dielectric on each channel region;
   depositing on the substrate and structures a first conductor, said first conductor having first/second/third layers as follows: TiN/Cu/TiN;
   forming a photoresist pattern on said first conductor;
   etching said first conductor to form a plurality of first conductive lines on the substrate and to form a first electrode on each said TFT structure, said lines and electrodes having TiN/Cu/TiN first/second/third layers;
   depositing and patterning a dielectric layer to provide inter-conductor isolation;
   depositing a second conductor having first/second/third layers as follows: TiN/Cu/TiN; and
   forming a photoresist pattern on said second conductor;
   etching said second conductor to form a plurality of second conductive lines on the substrate and to form a second electrode on each said TFT structure, said lines and electrodes having TiN/Cu/TiN first/second/third layers.

9. A method as in claim 8 in which said step of depositing on the substrate and structures a first conductor includes the steps of:
   depositing a first layer of TiN by physical vapor deposition (PVD);
   depositing a second layer of Cu on said first layer of TiN by CVD; and
   depositing a third layer of TiN on said second layer of Cu by PVD.

10. A method as in claim 8 in which said step of depositing said first conductor further includes:
    depositing a first layer of TiN having a thickness generally in the range of 100 Å to 1500 Å;
    depositing a second layer of Cu having a thickness generally in the range of 1000 Å to 10,000 Å on said first layer of TiN; and
    depositing a third layer of TiN having a thickness generally in the range of 100 Å to 1500 Å on said second layer of Cu.

11. A method as in claim 8 including, after said step of depositing said first conductor, depositing said dielectric layer by CVD.

12. A method as in claim 11 in which said step of depositing said second conductor includes the following steps:
    depositing a first layer of TiN by physical vapor deposition (PVD);
    depositing a second layer of Cu on said first layer of TiN by CVD; and
    depositing a third layer of TiN on said second layer of Cu by PVD.

13. A method as in claim 12 in which said step of depositing said second conductor further includes:
    depositing a first layer of TiN having a thickness generally in the range of 100 Å to 1500 Å;
    depositing a second layer of Cu having a thickness generally in the range of 1000 Å to 10,000 Å on said first layer of TiN; and
    depositing a third layer of TiN having a thickness generally in the range of 100 Å to 1500 Å on said second layer of Cu.

14. A method as in claim 8 in which said step of etching said first conductor includes the steps of
    using a wet etch process for etching TiN, etching said third layer;
    using a wet etch process for etching Cu, etching said second layer;
    using a wet etch process for etching TiN, etching said first layer; and
    removing said photoresist pattern.

15. A method as in claim 14 in which said step of etching said second conductor further includes
- using a wet etch process for etching TiN, etching said third layer;
- using a wet etch process for etching Cu, etching said second layer;
- using a wet etch process for etching TiN, etching said first layer; and
- removing said photoresist pattern.

16. A method as in claim 8 in which the TFTs of the LCD pixel array structure include gate, source, and drain electrodes, and said steps of forming a photoresist pattern on said first conductor and etching said first conductor forms a first electrode which is either said gate, source, or drain electrode, said steps of forming a photoresist pattern on said second conductor and etching said second conductor forms a second electrode which is said gate electrode, if said first electrode formed is either said source or drain electrode, or one of said source or drain electrodes, if said first electrode formed is said gate electrode, and further including the step of:
- if said first electrode formed is either said source or drain electrode, forming a third electrode during the steps of forming a photoresist pattern and etching said first conductor, said third electrode being said source electrode if said first electrode formed is said drain electrode, and said third electrode being said drain electrode if said first electrode formed is said source electrode; or
- if said first electrode formed is said gate electrode, forming a third electrode during the steps of forming a photoresist pattern and etching said second conductor, said third electrode being said source electrode if said second electrode formed is said drain electrode, and said third electrode being said drain electrode if said second electrode formed is said source electrode, said third electrode having first/second/third layers of TiN/Cu/TiN.

17. A method of forming a liquid crystal display (LCD) pixel array structure on an LCD substrate having a layer of polycrystalline silicon formed thereon, the method comprising:
- providing a plurality of thin film transistor (TFT) structures by patterning the polycrystalline silicon to form a plurality of active areas on the substrate, by forming source, drain, and channel regions in each active area, and by depositing a gate dielectric on each channel region;
- depositing on the substrate and structures a first conductor, said first conductor having first/second/third layers as follows: TiN/Cu/TiN;
- patterning said first conductor by forming a photoresist pattern on said first conductor and etching said first conductor to form a plurality of first conductive lines on the substrate and to form a gate electrode on each said TFT structure, said gate electrodes being integral with selected ones of said first conductive lines, said lines and gate electrodes having TiN/Cu/TiN first/second/third layers;
- depositing and patterning a dielectric layer to provide inter-conductor isolation;
- depositing a second conductor having first/second/third layers as follows: TiN/Cu/TiN; and
- patterning said second conductor by forming a photoresist pattern on said second conductor and etching said second conductor to form a plurality of second conductive lines on the substrate and to form source and drain electrodes on each said TFT structure, one of said source and drain electrodes of each TFT structure being integral with selected ones of said second conductive lines, said lines and said source and drain electrodes having TiN/Cu/TiN first/second/third layers.

18. A method as in claim 17 in which said step of depositing said first conductor further includes:
- depositing a first layer of TiN having a thickness generally in the range of 100 Å to 1500 Å;
- depositing a second layer of Cu having a thickness generally in the range of 1000 Å to 10,000 Å on said first layer of TiN; and
- depositing a third layer of TiN having a thickness generally in the range of 100 Å to 1500 Å on said second layer of Cu.

19. A method as in claim 17 in which said step of depositing said second conductor further includes:
- depositing a first layer of TiN having a thickness generally in the range of 100 Å to 1500 Å;
- depositing a second layer of Cu having a thickness generally in the range of 1000 Å to 10,000 Å on said first layer of TiN; and
- depositing a third layer of TiN having a thickness generally in the range of 100 Å to 1500 Å on said second layer of Cu.

20. A method as in claim 17 in which said step of patterning said first conductor includes etching said first conductor as follow:
- using a wet etch process for etching TiN, etching said third layer;
- using a wet etch process for etching Cu, etching said second layer;
- using a wet etch process for etching TiN, etching said first layer; and
- removing said photoresist pattern.

21. A method as in claim 20 in which said step of patterningsaid second conductor includes etching said second conductor as follow:
- using a wet etch process for etching TiN, etching said third layer;
- using a wet etch process for Cu, etching said second layer;
- using a wet etch process for etching TiN, etching said first layer; and
- removing said photoresist pattern.

22. In the manufacture of a liquid crystal display (LCD) on a substrate, a structure for forming a pattern of operative interconnections between a plurality of active areas on the LCD substrate, the structure for forming the operative interconnections comprising:
- a layered conductor extending over the substrate, the conductor having first/second/third layers as follows: TiN/Cu/TiN; and
- a layer of photoresist on said layered conductor, whereby, when the photoresist layer is patterned into a selected pattern of lines, wet etching processes can be used to form said layered conductor into a pattern of conductive lines.

23. The structure for forming operative interconnections during the manufacture of a LCD as in claim 22 in which said layer of photoresist is patterned into lines which define operative interconnections on the LCD substrate, and said layered conductor is also patterned into lines beneath said lines of photoresist, each said patterned line of layered conductor having first/second/third layers as follows: TiN/Cu/TiN.

24. The structure for forming operative interconnections during the manufacture of a LCD as in claim 23 wherein each said patterned line of photoresist and layered conductor is at least 2 microns wide.

25. The structure for forming operative interconnections during the manufacture of a LCD as in claim 22 in which the active areas on the LCD substrate include thin film transistor (TFT) structures each having source, drain and channel regions, and wherein said layered conductor and said layer of photoresist are patterned into a plurality of lines and electrodes such that, said layered conductor beneath said photoresist is patterned into conductive lines and conductive electrodes selected from gate, source, and drain electrodes.

26. The structure for forming operative interconnections during the manufacture of a LCD as in claim 22 in which the TiN/Cu/TiN layers of the layered conductor have thickness' as follows: first TiN layer generally in the range of 100 Å to 1500 Å thick; second copper layer generally in the range of 1000 Å to 10,000 Å thick; and third TiN layer generally in the range of 100 Å to 1500 Å thick.

* * * * *